United States Patent
Arai et al.

(10) Patent No.: US 8,590,606 B2
(45) Date of Patent: Nov. 26, 2013

(54) HEAT EXCHANGE ELEMENT AND MANUFACTURING METHOD THEREOF, HEAT EXCHANGER, AND HEAT EXCHANGE VENTILATOR

(75) Inventors: Hidemoto Arai, Tokyo (JP); Masaru Takada, Tokyo (JP); Takanori Imai, Tokyo (JP); Youichi Sugiyama, Tokyo (JP)

(73) Assignee: Mitsubishi Electric Corporation, Chiyuda-Ku, Tokyo (JP)

( * ) Notice: Subject to any disclaimer, the term of this patent is extended or adjusted under 35 U.S.C. 154(b) by 438 days.

(21) Appl. No.: 12/600,479

(22) PCT Filed: Jun. 18, 2007

(86) PCT No.: PCT/JP2007/062209
§ 371 (c)(1),
(2), (4) Date: Nov. 17, 2009

(87) PCT Pub. No.: WO2008/155810
PCT Pub. Date: Dec. 24, 2008

(65) Prior Publication Data
US 2010/0147499 A1    Jun. 17, 2010

(51) Int. Cl.
F28F 3/00    (2006.01)

(52) U.S. Cl.
USPC .......................................... 165/166

(58) Field of Classification Search
USPC .......................................... 165/166
See application file for complete search history.

(56) References Cited

U.S. PATENT DOCUMENTS

| | | | | |
|---|---|---|---|---|
| 3,568,462 A | * | 3/1971 | Hoffman et al. | 202/158 |
| 4,201,195 A | * | 5/1980 | Sakhuja | 126/675 |
| 4,434,842 A | * | 3/1984 | Gregory | 165/133 |
| 5,031,693 A | * | 7/1991 | VanDyke | 165/166 |

(Continued)

FOREIGN PATENT DOCUMENTS

| | | |
|---|---|---|
| AT | 380 104 | 10/1986 |
| JP | 55-145290 U | 10/1980 |

(Continued)

OTHER PUBLICATIONS

Office Action dated Sep. 8, 2011, issued in the corresponding Korean Patent Application No. 10-2009-7024411.

(Continued)

*Primary Examiner* — Brandon M Rosati
(74) *Attorney, Agent, or Firm* — Buchanan Ingersoll & Rooney PC

(57) ABSTRACT

According to the present invention, in constituting a heat exchange element having a stacked-layer structure in which sheet-like partition members added a moisture absorbent thereto and spacing members are stacked alternately, the spacing members being joined with the partition members so as to form air flow passages together with the partition members, each of the spacing members includes a plurality of section walls that divide a space between the partition member joined under the spacing member and the partition member joined on the spacing member into a plurality of flow passages, and one or more first section walls formed with holes that bring adjacent flow passages into communication with each other and one or more second section walls formed with no hole that brings adjacent flow passages into communication with each other are alternately arranged in each of the spacing members. The present invention facilitates to constitute a light-weight total-heat type heat exchanger having high heat exchanging efficiency using the heat exchange element.

8 Claims, 9 Drawing Sheets

(56) References Cited

U.S. PATENT DOCUMENTS

| | | | | |
|---|---|---|---|---|
| 6,145,588 A | * | 11/2000 | Martin et al. | 165/166 |
| 6,536,514 B1 | * | 3/2003 | Sugiyama et al. | 165/166 |
| 7,406,998 B2 | * | 8/2008 | Kudo | 165/10 |
| 2003/0094269 A1 | | 5/2003 | Aria et al. | |
| 2006/0048921 A1 | * | 3/2006 | Usui et al. | 165/109.1 |
| 2006/0070728 A1 | * | 4/2006 | Shin et al. | 165/166 |
| 2006/0113070 A1 | * | 6/2006 | Lee et al. | 165/166 |
| 2006/0168813 A1 | | 8/2006 | Arai et al. | |
| 2006/0196632 A1 | * | 9/2006 | Kudo | 165/10 |

FOREIGN PATENT DOCUMENTS

| | | |
|---|---|---|
| JP | 56-66697 A | 6/1981 |
| JP | 57-101294 A | 6/1982 |
| JP | 01-266491 A | 10/1989 |
| JP | 05-017368 U | 3/1993 |
| JP | 5-17368 U | 3/1993 |
| JP | 2000-24843 A | 1/2000 |
| JP | 2001-027489 | 1/2001 |
| JP | 2003-144834 A | 5/2003 |
| JP | 2003-148892 A | 5/2003 |
| JP | 2005-24207 A | 1/2005 |
| JP | 2005-201502 A | 7/2005 |
| KR | 20-0360162 | 8/2004 |
| KR | 10-2005-0087799 | 8/2005 |
| TW | 224508 | 6/1994 |
| TW | 200706817 | 2/2007 |
| WO | WO 2004/070312 | 8/2004 |

OTHER PUBLICATIONS

International Search Report for PCT/JP2007/062209 completed Sep. 10, 2007.

Written Opinion for PCT/JP2007/062209 completed Sep. 10, 2007.

Office Action (Notice of Rejection) dated Sep. 6, 2011, issued in the corresponding Japanese Patent Application No. 2009-520164, and an English Translation thereof.

Decision of a Patent Grant issued in the corresponding Taiwanese Patent Application No. 09820816660 dated Dec. 21, 2009.

Extended European Search Report dated Jun. 19, 2013 issued in corresponding European Patent Application No. 07 74 5459.3.

* cited by examiner

HEAT EXCHANGE ELEMENT AND MANUFACTURING METHOD THEREOF, HEAT EXCHANGER, AND HEAT EXCHANGE VENTILATOR

TECHNICAL FIELD

The present invention relates to a heat exchange element used for an air conditioner such as a heat exchange ventilator, a manufacturing method of the heat exchange element, a heat exchanger, and a heat exchange ventilator using the heat exchange element, and, more particularly to a total-heat type heat exchange element that performs both an exchanging operation of latent heat and an exchanging operation of sensible heat, a manufacturing method of the heat exchange element, a heat exchanger, and a heat exchange ventilator using the total-heat type heat exchange element.

BACKGROUND ART

In recent years, hermeticity and high thermal insulation of rooms have been developed for energy saving. Therefore, natural ventilation of rooms cannot be expected so much, and importance of a heat exchange ventilator capable of simultaneously realizing ventilation and air conditioning, particularly a total-heat type heat exchange ventilator having high heat exchanging efficiency is increased. The total-heat type heat exchange ventilator includes a total-heat type heat exchanger that performs both an exchanging operation of sensible heat and an exchanging operation of latent heat. The heat exchanger includes a total-heat type heat exchange element that performs both an exchanging operation of sensible heat and an exchanging operation of latent heat, and a frame body in which the heat exchange element is accommodated.

The total-heat type heat exchange element has a structure such that sheet-like partition members and corrugated spacing members are alternately joined one another. A moisture absorbent is added at least to the partition member. A plurality of air flow passages are formed by the partition member and the spacing member located under the partition member. A plurality of air flow passages are formed by the partition member and the spacing member located on the partition member. The exchanging operation of sensible heat and the exchanging operation of latent heat are performed between an air current flowing through the flow passages formed under the partition member and an air current flowing through the flow passages formed on the partition member through the partition members. A primary air current generated by supply of air from outside into a room is supplied to one of a flow passage formed under the partition member and a flow passage formed on the partition member, and a secondary air current generated by discharging air from the room to outside is supplied to the other flow passage.

The total-heat type heat exchange element is accommodated is in the frame body. The frame body is a box that is provided at its four sides with rectangular openings. The total-heat type heat exchange element is accommodated in the frame body such that an upper surface or a lower surface of each member in the layer stacking direction is oriented downward. The primary air current whose heat is to be exchanged flows into the heat exchanger through a predetermined rectangular opening formed in the frame body, and after the primary air current flows through the total-heat type heat exchange element, the primary air current flows out from the heat exchanger through a rectangular opening that is opposed to the rectangular opening described above. Similarly, the secondary air current whose heat is to be exchanged flows into the heat exchanger through another rectangular opening formed in the frame body, and after the secondary air current flows through the total-heat type heat exchange element, the secondary air current flows out from the heat exchanger through a rectangular opening that is opposed to the opening described above.

In the total-heat type heat exchange element, the exchanging operation of sensible heat and the exchanging operation of latent heat are performed through the partition members. Therefore, the heat exchanging efficiency in the heat exchange element is largely dependent on an effective moisture permeation area and heat conductivity of the partition member. Reduction in the effective moisture permeation area and reduction in the heat conductivity can be a factor that deteriorates the heat exchanging efficiency of the total-heat type heat exchange element. For example, when an adhesive of low moisture permeability is used and the partition member and the spacing member are joined to each other, the effective moisture permeation area of each partition member is reduced and the exchanging efficiency of latent heat is lowered.

To suppress the reduction in the effective moisture permeation area caused by an adhesive, according to a heat exchanger described in Patent Document 1, a partitioning plate (partition member) and a spacing member plate (spacing member) are joined to each other through a fluorine-based resin or a hydrocarbon-based resin of high hygroscopicity and moisture diffusibility. Further, according to a filter unit for a heat exchanger described in Patent Document 2, in laminating a large number of filters in which a flat liner (partition member) and a corrugated plate (spacing member) are joined to each other through an adhesive, only peripheries of filters that are adjacent to each other in the vertical direction (layer stacking direction) are joined to each other through an adhesive.

Meanwhile, to enhance the heat conductivity of the heat exchange element, according to a cooling absorption element described in Patent Document 3, a plurality of holes are formed in an entire corrugated plate (spacing member), flow passages formed by a flat plate (partition member) and a corrugated plate located on or under the flat plate are brought into communication with each other through the holes, thereby disturbing a flow of air and, with this structure, the heat conductivity is enhanced. Similarly to this cooling absorption element, also according to a plate-fin type heat exchanger described in Patent Document 4, a plurality of holes are formed in an entire fin (spacing member), flow passages formed by a plate (partition member) and a fin located on or under the plate are brought into communication with each other through the holes, thereby disturbing a flow of air and with this arrangement, the heat conductivity is enhanced.

If the plurality of holes are formed in the spacing member as described above, the heat conductivity is enhanced and the weight of the heat exchange element is reduced. In the case of a heat exchange ventilator of a type having a main body arranged under a roof, or a heat exchange ventilator of a type that is suspended from a ceiling, it is very preferable that the weight of the heat exchange ventilator is reduced to prevent the ventilator from falling at the time of an earthquake or the like and to enhance safety. Further, when a plurality of holes are formed in the spacing member, an adhesive is not applied to a portion of the spacing member where the hole is formed. Therefore, even when a partition member and a spacing member are joined to each other using an adhesive having poor hygroscopicity, poor moisture diffusibility and poor moisture permeability, an effective moisture permeation area of the heat exchange element can be easily widened. As a result, it becomes easy to obtain a heat exchange element having high exchanging efficiency of latent heat.

Patent Document 1: Japanese Patent Application Laid-open No. 2005-24207

Patent Document 2: Japanese Patent Application Laid-open No. 2005-201502

Patent Document 3: Japanese Patent Application Laid-open No. 2003-144834

Patent Document 4: Japanese Utility Model Application Laid-open No. S55-145290

DISCLOSURE OF INVENTION

Problem to be Solved by the Invention

However, if a plurality of holes are formed in an entire spacing member and flow passages formed by a partition member and a spacing member joined on or under the partition member are brought into communication with each other through the holes as in the cooling absorption element described in Patent Document 3 or as in the plate-fin type heat exchanger described in Patent Document 4, leakage of a primary air current or a secondary air current from the heat exchanger is increased when the heat exchange element is accommodated in the frame body to form the heat exchanger.

That is, in the process in which an air current flows through a flow passage in the heat exchange element, an amount of a primary air current that flows out from the holes and that flows out from the heat exchanger through an outlet for a secondary air current, and an amount of a secondary air current that flows out from the holes and that flows out from the heat exchanger through an outlet for the primary air current are increased. Further, an amount of a primary air current that flows out from the holes and that flows into the heat exchanger from an inlet for a secondary air current, and an amount of the secondary air current that flows out from the holes and that flows into the heat exchanger from an inlet for the primary air current are increased. As a result, it is difficult to enhance the heat exchanging efficiency of the heat exchanger.

The present invention has been achieved in view of the above circumstances, and an object of the present invention is to obtain a heat exchange element with which it is easy to configure a light-weight heat exchanger having high heat exchanging efficiency. Another object of the present invention is to obtain a manufacturing method of a heat exchange element with which it is easy to configure a light-weight heat exchanger having high heat exchanging efficiency. Still another object of the present invention is to obtain a light-weight heat exchanger having high heat exchanging efficiency. Still another object of the present invention is to obtain a heat exchange ventilator with which it is easy to configure a light-weight heat exchange ventilator having high heat exchanging efficiency.

Means for Solving Problem

A heat exchange element according to the present invention that achieves the above mentioned object has a stacked-layer structure in which sheet-like partition members added a moisture absorbent thereto and spacing members are stacked alternately, the spacing members being joined with the partition members so as to form air flow passages together with the partition members, wherein each of the spacing members includes a plurality of section walls that divide a space between the partition member joined under the spacing member and the partition member joined on the spacing member into a plurality of flow passages, and one or more first section walls formed with holes that bring adjacent flow passages into communication with each other and one or more second section walls formed with no hole that brings adjacent flow passages into communication with each other are alternately arranged in each of the spacing members.

A manufacturing method of a heat exchange element according to the present invention that achieves the above mentioned object, in which sheet-like partition members added a moisture absorbent thereto and spacing members are stacked alternately, the spacing members being joined with the partition members so as to form a flow passage group constituted by a plurality of flow passages together with the partition members, each of the spacing members includes a plurality of section walls that divide a space between the partition member joined under the spacing member and the partition member joined on the spacing member into a plurality of flow passages, the manufacturing method includes a unit manufacturing step of obtaining a plurality of element-constituting units each having the partition member and the spacing member joined to the partition member; and a layer stacking step of joining the element-constituting units to each other to obtain a heat exchange element in which a plurality of the element-constituting units are joined one another, wherein one or more first section walls formed with holes and one or more second section walls formed with no hole are alternately arranged in each of the spacing members.

A heat exchanger according to the present invention that achieves the above mentioned object includes a heat exchange element and a box-like frame body accommodating the heat exchange element, in which the heat exchange element has a stacked-layer structure in which sheet-like partition members added a moisture absorbent thereto and spacing members are stacked alternately, the spacing members being joined with the partition members so as to form air flow passages together with the partition members, the frame body includes a top plate member covering an upper surface of the heat exchange element, a bottom plate member covering a lower surface of the heat exchange element, and four rectangular frame portions that are located between the top plate member and the bottom plate member to border the heat exchange element, wherein each of the spacing members includes a plurality of section walls that divide a space between the partition member joined under the spacing member and the partition member joined on the spacing member into a plurality of flow passages, and one or more first section walls formed with holes that bring adjacent flow passages into communication with each other and one or more second section walls formed with no hole that brings adjacent flow passages into communication with each other are alternately arranged in each of the spacing members.

A heat exchange ventilator according to the present invention that achieves the above mentioned object includes a supply ventilation passage, an exhaust ventilation passage intersecting with the supply ventilation passage, a supply air blower arranged in the supply ventilation passage, an exhaust air blower arranged in the exhaust ventilation passage, and a heat exchanger arranged at an intersection between the supply ventilation passage and the exhaust ventilation passage, in which the heat exchanger includes a heat exchange element and a box-like frame body accommodating the heat exchange element, wherein the heat exchange element has a stacked-layer structure in which sheet-like partition members added a moisture absorbent thereto and spacing members are stacked alternately, the spacing members being joined with the partition members so as to form air flow passages together with the partition members, the frame body includes a top plate member covering an upper surface of the heat exchange element, a bottom plate member covering a lower surface of the heat exchange element, and four rectangular frame portions that are located between the top plate member and the bottom plate member to border the heat exchange element, each of the spacing members includes a plurality of section walls that divide a space between the partition member joined under the spacing member and the partition member joined on the spacing member into a plurality of flow passages, and one or more first section walls formed with holes that bring adjacent flow passages into communication with each other and one or more second section walls formed with no hole that brings adjacent flow passages into communication with each other are alternately arranged in each of the spacing members.

Effect of the Invention

The heat exchange element according to the present invention includes a spacing member in which one or more first section walls and second section walls are alternately arranged. Therefore, an air current flowing through the heat exchange element flows out from the holes formed in the first section wall, thereby disturbing the air current, and outflow from undesired direction can be suppressed by the second section wall. According to the heat exchanger using the heat exchange element, leakage of a primary air current or a secondary air current can be suppressed as compared with a case that all of the section walls are made as the first section walls. The heat conductivity is enhanced as compared with a case that all the section walls are made as the second section walls. As a result, according to the heat exchange element of the present invention, it is easy to configure a light-weight total-heat type heat exchanger having high heat exchanging efficiency.

According to the manufacturing method of a heat exchange element of the present invention, the heat exchange element described above can be manufactured. According to the present invention, it is easy to obtain a heat exchange element with which a light-weight total-heat type heat exchanger having high heat exchanging efficiency can be easily constituted. According to the heat exchanger of the present invention, the heat exchange element is accommodated in the box-like frame body. Thus, according to the present invention, it is easy to obtain a light-weight total-heat type heat exchanger having high heat exchanging efficiency. The heat exchange ventilator according to the present invention includes the heat exchanger. Thus, according to the present invention, it is easy to obtain a light-weight total-heat type heat exchange ventilator having high heat exchanging efficiency.

Figure 1:
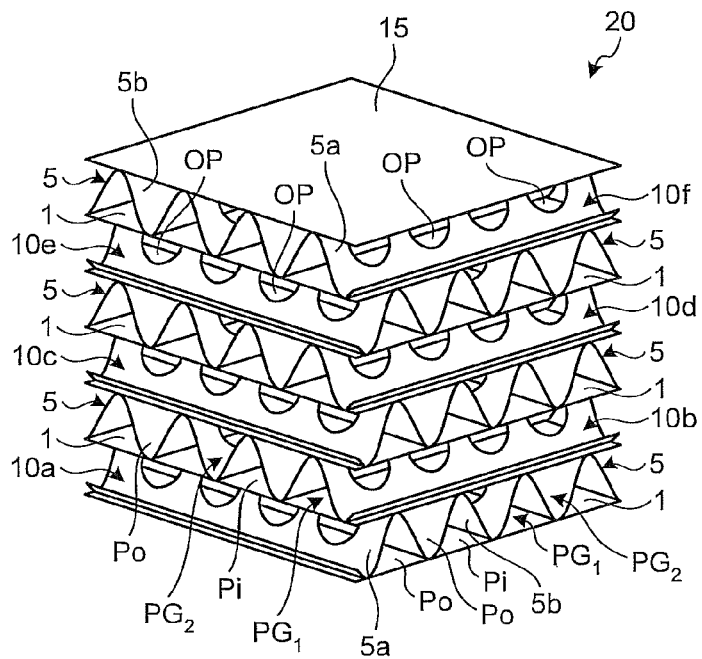
FIG. 1 is a schematic perspective view of a heat exchange element according to the present invention.

EXPLANATIONS OF LETTERS OR NUMERALS 1 partition member
1A long material that becomes material of partition member
5 spacing member
5A long material that becomes material of spacing member
10a to 10f element-constituting unit
10A long element-constituting unit material
20, 20A, 20B heat exchange element
21 top plate member
23 bottom plate member
25a to 25d rectangular frame portion
30 frame body
40, 40A heat exchanger
43 supply ventilation passage
45 exhaust ventilation passage
51 supply air blower
53 exhaust air blower
70 heat exchange ventilator
Po first flow passage
Pi second flow passage
PG1 first flow passage group
PG2 first flow passage group
L length of hole along longitudinal direction of first flow passage
PC arrangement pitch of flow passage in flow passage group including first flow passage and second flow passage
W width of region that extends in layer stacking direction of partition members and spacing members in rectangular frame portion

BEST MODE(S) FOR CARRYING OUT THE INVENTION

Exemplary embodiments of a heat exchange element and a manufacturing method thereof, a heat exchanger, and a heat exchange ventilator according to the present invention will be explained below in detail with reference to the accompanying drawings. The present invention is not limited to the embodiments.

First Embodiment

Figure 2:
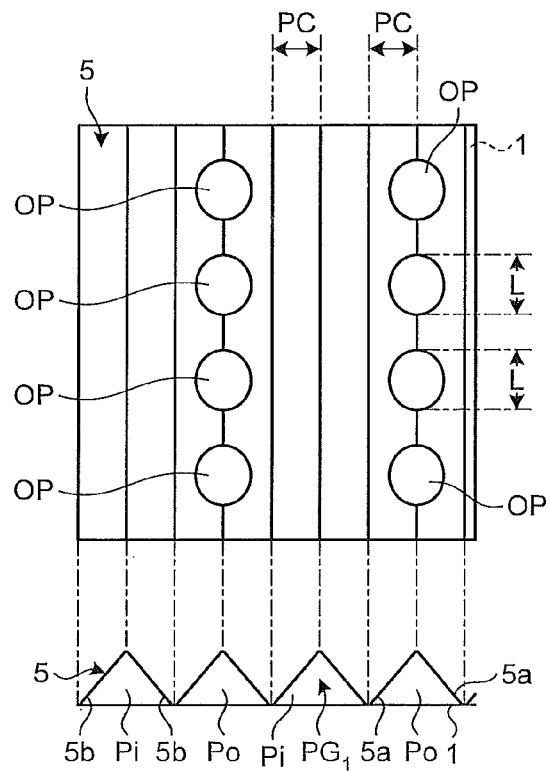
FIG. 2 is a schematic diagram of a partition member and a spacing member joined on the partition member constituting the heat exchange element shown in FIG. 1.
Figure 3:
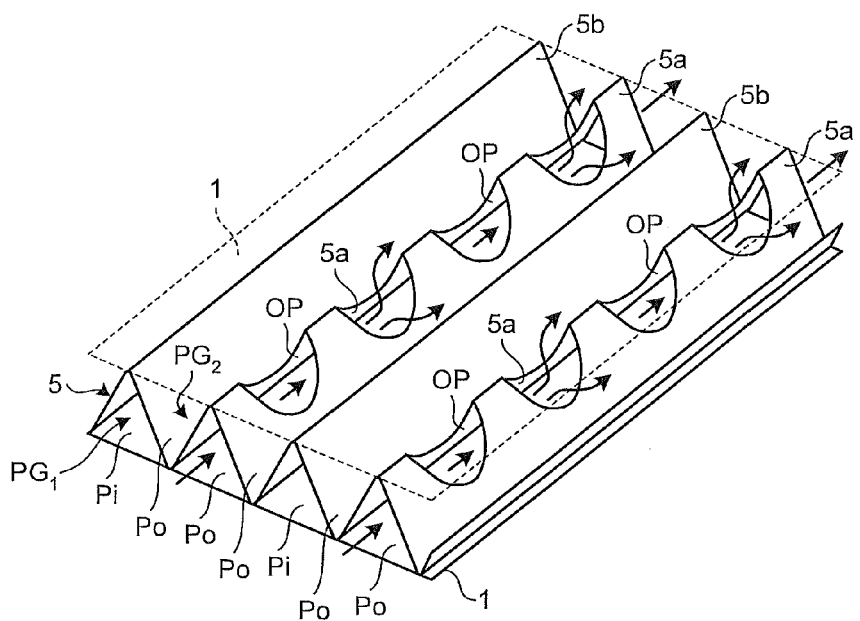
FIG. 3 is a schematic perspective view of the spacing member and partition members joined on and under the spacing member constituting the heat exchange element shown in FIG. 1.

FIG. 1 is a schematic perspective view of a heat exchange element according to the present invention, FIG. 2 is a schematic diagram of a partition member and a spacing member joined on the partition member constituting a heat exchange element shown in FIG. 1, and FIG. 3 is a schematic perspective view of the spacing member and partition members joined on and under the spacing member constituting the heat exchange element shown in FIG. 1.

A heat exchange element 20 shown in FIG. 1 is of a cross-flow type having a stacked-layer structure in which sheet-like partition members 1 and corrugated spacing members 5 are alternately joined one another. According to the heat exchange element 20, the stacked-layer structure is formed by laminating six element-constituting units 10a to 10f. A top member 15 is further joined the uppermost element-constituting unit 10f. Each of the element-constituting units 10a to 10f is formed by bonding the spacing member 5 on the partition member 1. The element-constituting units 10a to 10f are laminated such that corrugation of the spacing member 5 in one element-constituting unit and corrugation of the spacing member 5 of an element-constituting unit located on or under the element-constituting unit intersect with each other substantially at right angles as viewed from above. In other words, the element-constituting units 10a to 10f are joined one another such that a longitudinal direction of a mountain or a valley of the corrugated spacing member 5 in one element-constituting unit and a longitudinal direction of a mountain or a valley of the corrugated spacing member 5 of the element-constituting unit located on or under the element-constituting unit intersect with each other substantially at right angles as viewed from above.

The partition member 1, the respective spacing member 5 and the top member 15 are mainly made of cellulose fiber material (paper). The partition member 1 and a spacing member 5 of the element-constituting unit 10a to 10f; element-constituting units that are adjacent in the layer stacking direction; and the uppermost element-constituting unit 10f and the top member 15 are joined to each other through an adhesive. A moisture absorbent (not shown) is added to the partition members 1, the respective spacing members 5 and the top member 15. That is, the heat exchange element 20 is a total-heat type heat exchange element.

As shown in FIGS. 1 to 3, a space between the spacing member 5 and the partition member 1 joined under the spacing member 5 is divided into a first flow passage group PG1 having a plurality of flow passages because the spacing member 5 has the corrugated shape. Similarly, a space between the spacing member 5 and the partition member 1 joined on the spacing member 5 is divided into a second flow passage group PG2 (see FIG. 1 or 3) having a plurality of flow passages. The spacing member 5 includes a plurality of first section walls 5a and a plurality of second section walls 5b that divide a space between the partition member 1 joined under the spacing member 5 and the partition member 1 joined on the spacing member 5 into a plurality of flow passages.

A plurality of holes that bring adjacent flow passages into communication with each other are formed in a plurality of positions of each first section wall 5a. Holes that bring adjacent flow passages into communication with each other are not formed in the second section walls 5b. In each of the spacing members 5, two first section walls 5a and two second section walls 5b are alternately arranged. Each hole formed between adjacent first section walls 5a includes one region of one hole OP located at a top of a mountain of the corrugated shape as viewed from the partition member 1 joined under the spacing member 5. Therefore, a joined portion between the spacing member 5 and the partition member 1 located on the spacing member 5 is divided by the hole OP.

Each of the spacing member 5 is formed with the plurality of holes OP. Therefore, a flow passage group in which the first flow passage group PG1 and the second flow passage group PG2 are combined with each other includes a first flow passage Po formed with a plurality of holes that are in communication with adjacent flow passage, and a second flow passage Pi that is isolated from the adjacent flow passage. In the first flow passage group PG1, the first flow passages Po and the second flow passages Pi are alternately arranged in parallel to each other. In the second flow passage group PG2, only the plurality of first flow passages Po are arranged in parallel to each other.

As shown with solid arrows in FIG. 3, a portion of an air current that flows through left one of two first flow passages Po in the first flow passage group PG1 flows from the holes OP into the adjacent first flow passage Po (the first flow passage Po in the second flow passage group PG2), and cannot flow into the next adjacent second flow passage Pi (the second flow passage Pi in the first flow passage group PG1) and flows through the heat exchange element 20 (see FIG. 1). A portion of an air current that flows through right one of the two first flow passages Po in the first flow passage group PG1 flows from the holes OP into the adjacent first flow passage Po (the first flow passage Po in the second flow passage group PG2), cannot flow into the next adjacent second flow passage Pi (the second flow passage Pi in the first flow passage group PG1), and flows through the heat exchange element 20 (see FIG. 1), or flows out from the heat exchange element 20 through the holes OP. A length L of each hole OP along the first flow passage Po can be a value equal to or less than two times of an arrangement pitch PC (see FIG. 2) of the flow passage in the flow passage group in which each flow passage of the first flow passage group PG1 and each flow passage of the second flow passage group PG2 are added.

In the heat exchange element 20 with the structure described above, the exchanging operation of sensible heat and the exchanging operation of latent heat are performed through the partition member 1 between an air current, for example, a primary air current flowing through the flow passages Po and Pi formed under the partition member 1, and an air current, for example, a secondary air current flowing through the flow passages Po and Pi formed on the partition member 1. At that time, the primary air current or the secondary air current flows into an adjacent flow passage from the holes OP formed in the spacing member 5 and this disturbs the air current. Therefore, the heat conductivity to the partition member 1 is enhanced as compared with a case that no hole OP is formed.

The plurality of holes OP are formed in each of the spacing member 5. Therefore, as compared with a case that the first flow passage group PG1 and the second flow passage group PG2 are constituted only by the second flow passages Pi, a mass of each of the spacing member 5 is reduced in weight by a value corresponding to the plurality of holes OP. It is possible to easily reduce the weight of the heat exchange element 20 by appropriately selecting a size and the number of the holes OP.

Figure 4:
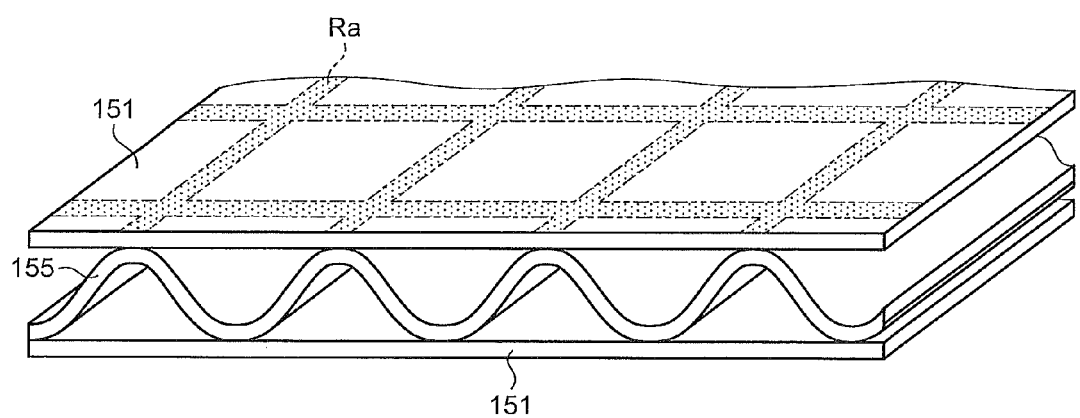
FIG. 4 is a perspective view for explaining an effective moisture permeation area at the partition member.

Further, an adhesive is not applied to a region of the spacing member 5 where no hole OP is formed. Therefore, it is easy to widen the effective moisture permeation area in each of the partition member 1. As shown in FIG. 4 for example, when partition members 151 are joined on and under a corrugated spacing member 155 formed with no hole, a flat surface shape of an adhering region Ra in which an adhering region of an adhesive on a lower surface of the partition member 151 and an adhering region of an adhesive on an upper surface are added becomes a lattice shape in the case of a cross-flow type heat exchange element. A difference of an area of the partition member 151 as viewed from above and an area of the adhering region Ra as viewed from above becomes an effective moisture permeation area of the partition member 151. On the other hand, if the holes OP are formed in a plurality of positions of the spacing member, because no adhesive is applied to a region where the holes OP are formed, the gross area of the regions of the adhering region Ra located above the holes OP is incorporated in the effective moisture permeation area. Therefore, even when an adhesive having poor hygroscopicity, poor moisture diffusibility and poor moisture permeability is used, it is easy to widen the effective moisture permeation area in each of the partition member 1 in the heat exchange element 20.

In the heat exchange element 20, the flow passage group including the first flow passage Po and the second flow passage Pi is formed in the space between the partition member 1 joined under the spacing member 5 and the partition member 1 joined on the partition member 1. Therefore, most of an air current flowing out from the holes OP in the first flow passage Po flows through the adjacent flow passage in the flow passage group. Thus, when a heat exchanger is constituted using the heat exchange element 20, leakage of an air current is reduced as compared with a case that the flow passage group is constituted only by the first flow passage Po.

For these reasons, if the heat exchange element 20 is used, it becomes easy to constitute a light-weight heat exchanger having high heat exchanging efficiency. For example, a pitch between mountains of the corrugated spacing member 5 is set to 6.0 millimeters, a height of the mountain is set to 2.5 millimeters, a shape of each hole OP when the spacing member 5 is developed is set to a circle having a diameter of 6.0 millimeters, and a pitch between the holes OP of each of the first flow passage Po is set to 24 millimeters. With this arrangement, a mass of the spacing member 5 can be reduced by about 7% as compared with a case that no hole OP is formed. Further, as compared with a case that no hole OP is formed in each of the spacing member 5, a percentage of the effective moisture permeation area of the partition member 1 on and under which the spacing members 5 are joined one each can be increased by about 4.5 points. As compared with a heat exchanger using a heat exchange element in which no hole OP is formed in each of the spacing member 5, it is easy to obtain a heat exchanger in which an exchanging rate of latent heat is enhanced by about 10%.

The heat exchange element 20 that exhibits the above-described technical effect can be produced by a method including a unit manufacturing step of obtaining a plurality of element-constituting units having a partition member and a spacing member joined to the partition member, and a layer stacking step of joining the element-constituting units to each other to obtain a heat exchange element in which a plurality of element-constituting units are laminated and arranged. At that time, one or more first section walls formed with holes and one or more second section walls formed with no holes are alternately arranged. Each step will be explained with reference to the reference numerals used in FIG. 1.

The unit manufacturing step can be divided into a first sub-step and a second sub-step described below. At the first sub-step, a long material that becomes a material of the spacing member 5 (see FIG. 1) in the future is formed into a corrugated shape to obtain a long corrugated molded article. A large number of holes are formed in advance in the long material in lines. In the long corrugated article, one line holes of the large number of holes formed in lines are distributed in tops of every other mountain in the corrugated shape. The "one line holes" mentioned means a plurality of holes formed one line arranged in a direction intersecting with a longitudinal direction of the long material. Next, an adhesive, for example, a water solvent-based adhesive such as a vinyl acetate-based emulsion adhesive is applied to tops of corrugated mountains on one surface of the corrugated article. A desired moisture absorbent, for example, alkali metal salt or a water-soluble moisture absorbent such as alkali metal salt can be added to the adhesive.

Thereafter, the long material that becomes a material of the partition member 1 (see FIG. 1) is placed on the corrugated article, and they are joined to each other through the adhesive, thereby obtaining a long element-constituting unit material. When the heat exchange element 20 shown in FIG. 1 is to be produced, the flow passage group that becomes the first flow passage group PG1 is formed when the long element-constituting unit material is formed. That is, the flow passage group including the first flow passage Po and the second flow passage Pi is formed.

At the second sub-step, the element-constituting unit material is cut into a predetermined size, and a plurality of element-constituting units having a structure in which the partition member 1 and the spacing member 5 are joined to each other through an adhesive are obtained. These element-constituting units become any of the element-constituting units 10*a* to 10*f* shown in FIG. 1.

At the layer stacking step that is performed after the unit manufacturing step, an adhesive, for example water solvent-based adhesive such as vinyl acetate-based emulsion adhesive, is applied to tops of corrugated mountains of the spacing member 5 constituting the element-constituting unit. A desired moisture absorbent, for example, alkali metal salt or a water-soluble moisture absorbent such as alkali metal salt can be added to the adhesive. Next, the element-constituting units to which the adhesive is applied are sequentially joined one another while selecting a direction of the element-constituting units such that a direction of corrugation of the spacing member 5 in one element-constituting unit and a direction of corrugation of the spacing member 5 of the element-constituting unit on or under the spacing member 5 intersect with each other substantially at right angles as viewed from above, and the element-constituting units that are adjacent in the layer stacking direction are joined to each other. Thereafter, the top member 15 (see FIG. 1) is joined to the spacing member 5 of the uppermost element-constituting unit using an adhesive. By bonding the top member 15, the entire heat exchange element 20 shown in FIG. 1 is obtained.

Figure 5:
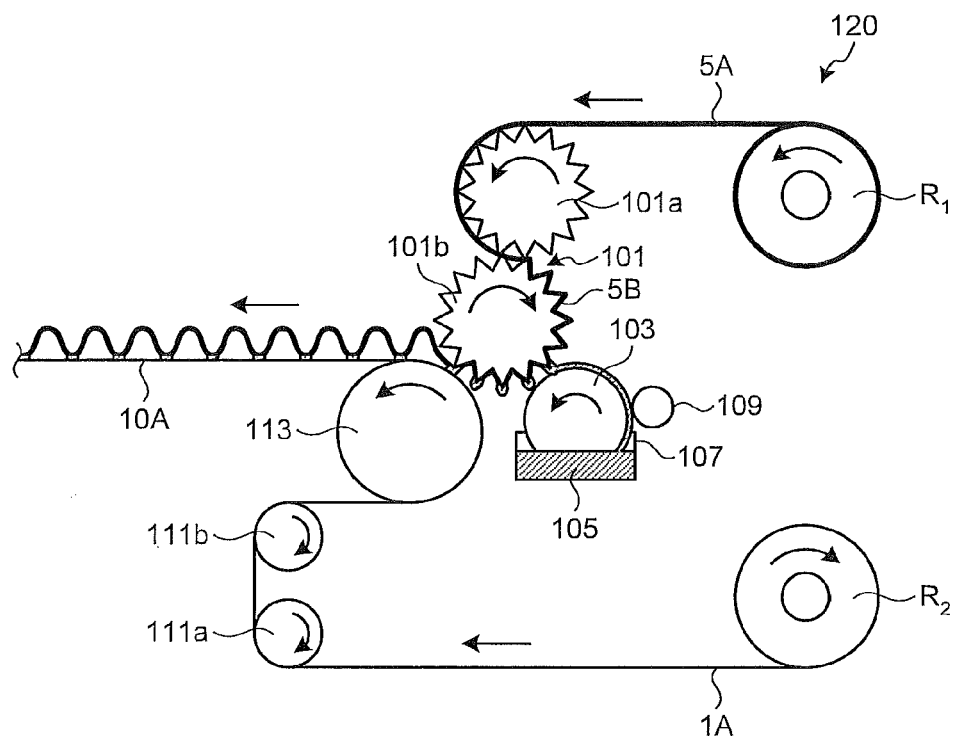
FIG. 5 is a schematic diagram of an example of an apparatus used when long element-constituting unit materials are continuously manufactured at a unit manufacturing step in a manufacturing method of the heat exchange element according to the present invention.

The long element-constituting unit materials can be performed at the unit manufacturing step continuously using an apparatus shown in FIG. 5 for example. In this case, a long material that becomes a material of a spacing member, and a long material that becomes a material of a partition member are formed into roll shapes in advance.

Figure 6:
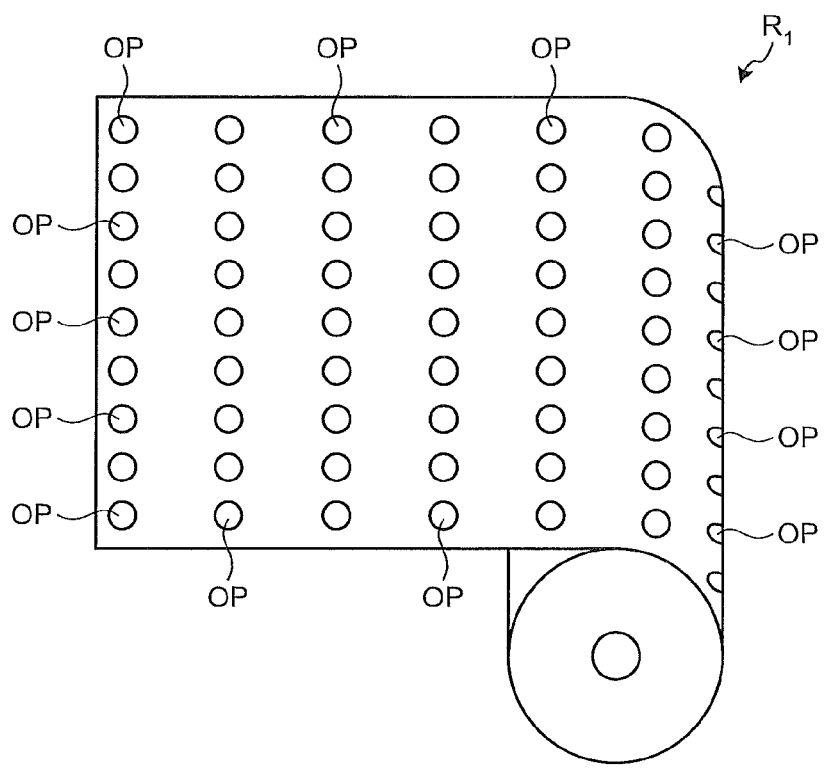
FIG. 6 is a schematic diagram of an example of a roll used in the apparatus shown in FIG. 5.

FIG. 5 is a schematic diagram of an example of an apparatus used when long element-constituting unit materials are continuously produced at the unit manufacturing step. FIG. 6 is a schematic diagram of an example of a roll used in the apparatus shown in FIG. 5. An apparatus 120 shown in FIG. 5 is a single facer apparatus. In this single facer apparatus, a long material 5A that becomes a material of a spacing member is formed in advance into a roll R1, and a long material 1A that becomes a material of a partition member is formed in advance into a roll R2. As shown in FIG. 6, many holes OP are formed in advance in lines in the material 5A formed into the roll R1.

In the apparatus 120, the material 5A pulled out from the roll R1 is first sent to a corrugator 101 having a pair of corrugated rolls 101a and 101b. In the corrugator 101, the gear-like upper corrugated roll 101a and the gear-like lower corrugated roll 101b mesh with each other and rotate. The material 5A is sequentially formed into a corrugated shape at a position where the corrugated rolls 101a and 101b mesh with each other. As a result, a long corrugated article 5B is continuously formed. In the corrugated article 5B, one line holes of the large number of holes OP formed in lines are distributed in tops of every other mountain in the corrugated shape.

Next, the corrugated article 5B is sent in a predetermined direction by the lower corrugated roll 101b, and an adhesive 105 is applied to the corrugated article 5B by an application roll 103 along the way. The adhesive 105 is stored in an adhesive tank 107, and a peripheral surface of the application roll 103 is partially soaked in the adhesive tank 107. The peripheral surface of the application roll 103 is substantially in contact with a top of a tooth of the lower corrugated roll 101b. If the application roll 103 rotates in a predetermined direction, the adhesive 105 adheres to the peripheral surface of the application roll 103, and the adhesive 105 is applied to one of surfaces of the corrugated article 5B. A squeezing roll 109 is arranged near the application roll 103 so that the adhesive 105 does not excessively adhere to the peripheral surface of the application roll 103. By adjusting a distance between the lower corrugated roll 101b and the squeezing roll 109, an amount of application of the adhesive 105 to the corrugated article 5B can be adjusted.

Meanwhile, the material 1A pulled out from the roll R2 is introduced into a press roll 113 by two guide rolls 111a and 111b. The press roll 113 is arranged such that its peripheral surface substantially comes into contact with a top of a tooth of the lower corrugated roll 101b. The material 1A is brought into contact with the corrugated article 5B under pressure in the sending process in a predetermined direction by the press roll 113. Because the adhesive 105 is applied to the corrugated article 5B as described above, the material 1A that is in contact with the corrugated article 5B under pressure is pasted on the corrugated article 5B by the adhesive 105. As s result, a long element-constituting unit material 10A that becomes a material of the element-constituting unit is formed. The corrugated rolls 101a and 101b and the press roll 113 are heated to a predetermined temperature higher than about 150° C. to make it easy to have the shapes of the corrugated articles 5B aligned. In FIG. 5, a rotation direction of the rolls and a transfer direction of the materials 1A and 5A are shown with solid arrows.

Figure 7:
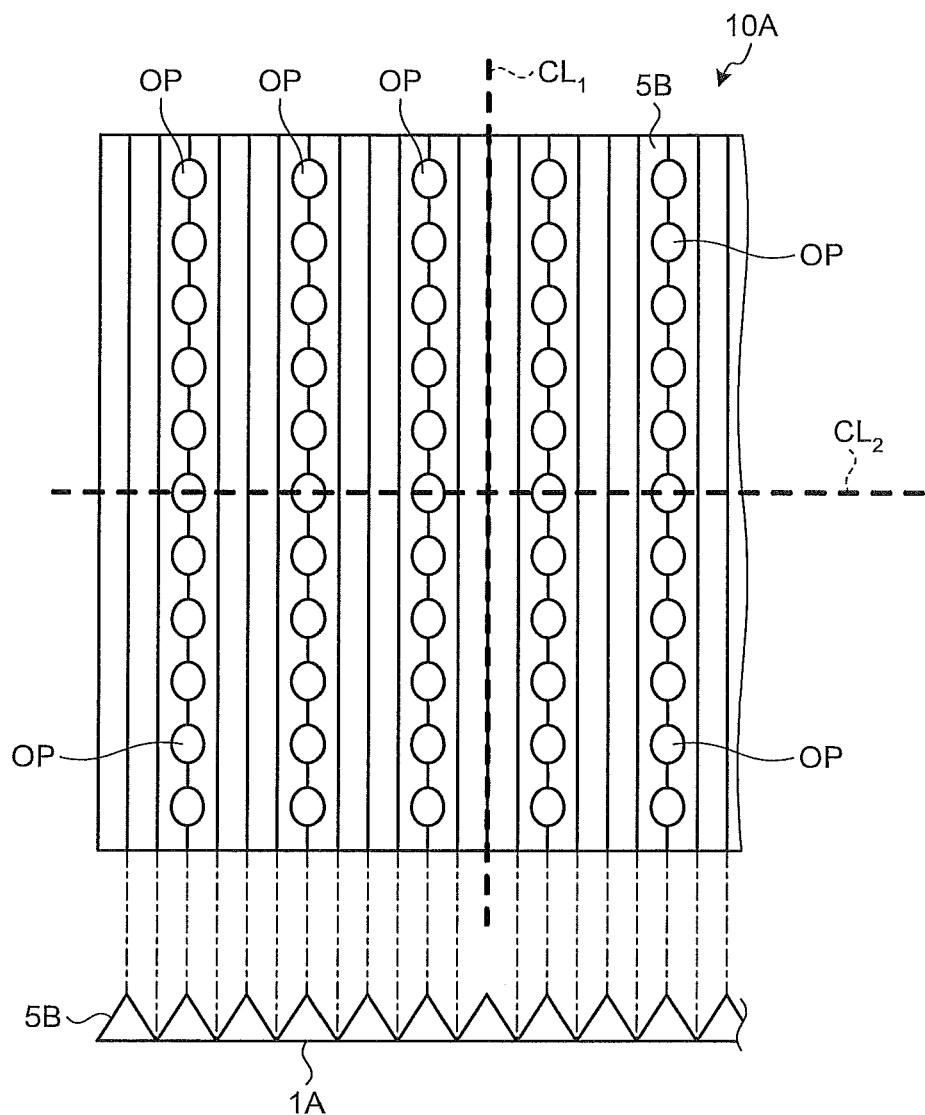
FIG. 7 is a schematic plan view of an example of a cutting line that is set when the long element-constituting unit material is cut into a plurality of element-constituting units at the unit manufacturing step in the manufacturing method of the heat exchange element according to the present invention.

Thereafter, by cutting the element-constituting unit 10a into a predetermined size by a cutter, element-constituting units that becomes a material of the element-constituting units 10a to 10f (see FIG. 1) are continuously formed. If widths of the materials 1A and 5A (see FIG. 5) are widened to some extent, an element-constituting unit of a desired size can be easily obtained under high productivity by cutting the element-constituting unit material 10A along cutting lines CL1 and CL2 shown in FIG. 7. Further, it is easy to change the size of the element-constituting unit. In addition, a range of a permissible error of a cutting position can be widened.

Figure 8:
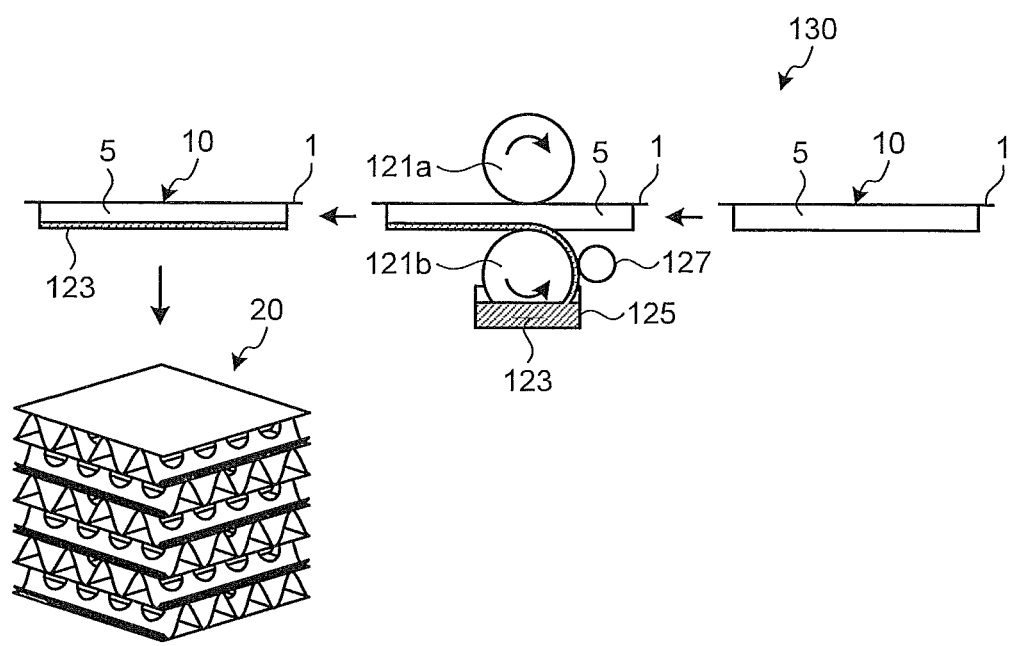
FIG. 8 is a schematic diagram of an example of an apparatus used when an adhesive is applied to the element-constituting unit at a layer stacking step in the manufacturing method of the heat exchange element according to the present invention.

The adhesive can be applied to each element-constituting unit using an apparatus schematically shown in FIG. 8 at the layer stacking step where the element-constituting units obtained in this manner are laminated to obtain a heat exchange element.

An apparatus 130 shown in FIG. 8 includes a pair of rolls 121a and 121b, an adhesive tank 125 in which an adhesive 123 is stored, a squeezing roll 127 arranged near the roll 121b, and a transfer device (not shown). The element-constituting unit 10 is transferred to the pair of rolls 121a and 121b by the transfer device such that the partition member 1 is oriented upward and the spacing member 5 is oriented downward, and the adhesive is applied here. The element-constituting units 10 are sequentially transferred to the pair of rolls 121a and 121b at a predetermined distance therebetween.

The upper roll 121a of the pair of rolls 121a and 121b functions as a transfer roll that transfers the element-constituting unit 10 in a predetermined direction, and a peripheral surface of a lower roll 121b is partially soaked in the adhesive tank 125, and the lower roll 121b functions as an application roll that applies the adhesive 123 to the element-constituting unit 10. By rotating the roll 121b in a predetermined direction, the adhesive 123 adheres to the peripheral surface of the roll 121b, and the adhesive 123 is applied to the spacing member 5 of the element-constituting unit 10. The squeezing roll 127 is arranged near the roll 121b to remove excessive parts of the adhesive 123 adhering to the peripheral surface of the roll 121b. By adjusting a distance between the roll 121b and the squeezing roll 127, an amount of the adhesive 123 applied to the element-constituting unit 10 can be adjusted.

The element-constituting units 10 to which the adhesive 123 is applied are joined one another in a predetermined orientation as described above, and element-constituting units 10 that are adjacent to each other in the layer stacking direction are joined to each other through the adhesive 123. Thereafter, the heat exchange element 20 shown in FIG. 1 can be obtained by bonding the top member 15 (see FIG. 1) to the element-constituting unit 10 through the adhesive 123.

Second Embodiment

Figure 9:
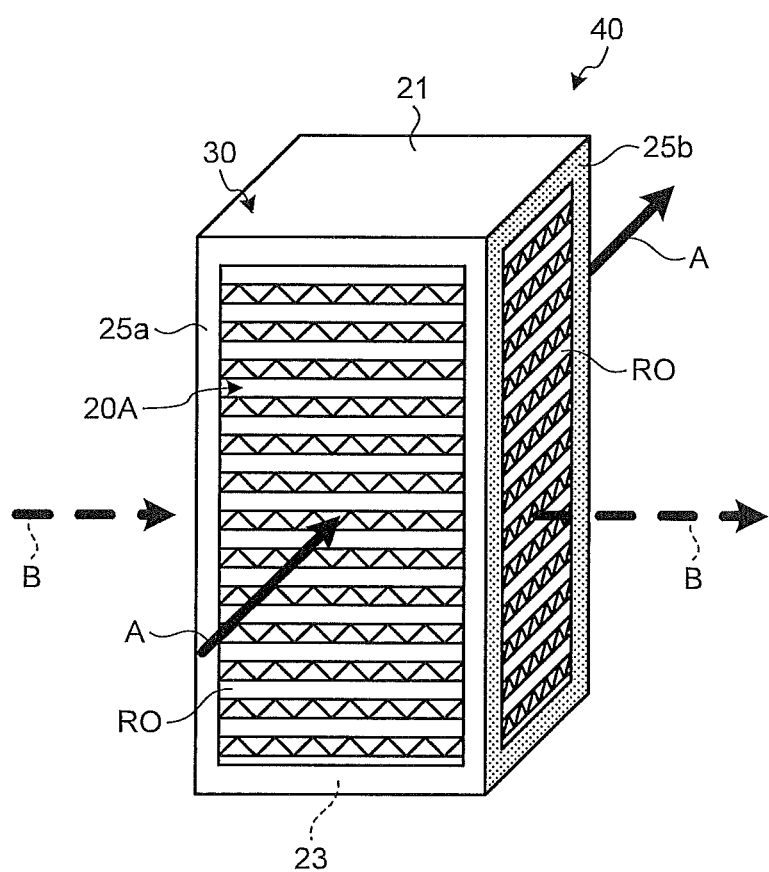
FIG. 9 is a schematic perspective view of an example of a heat exchanger according to the present invention.
Figure 10:
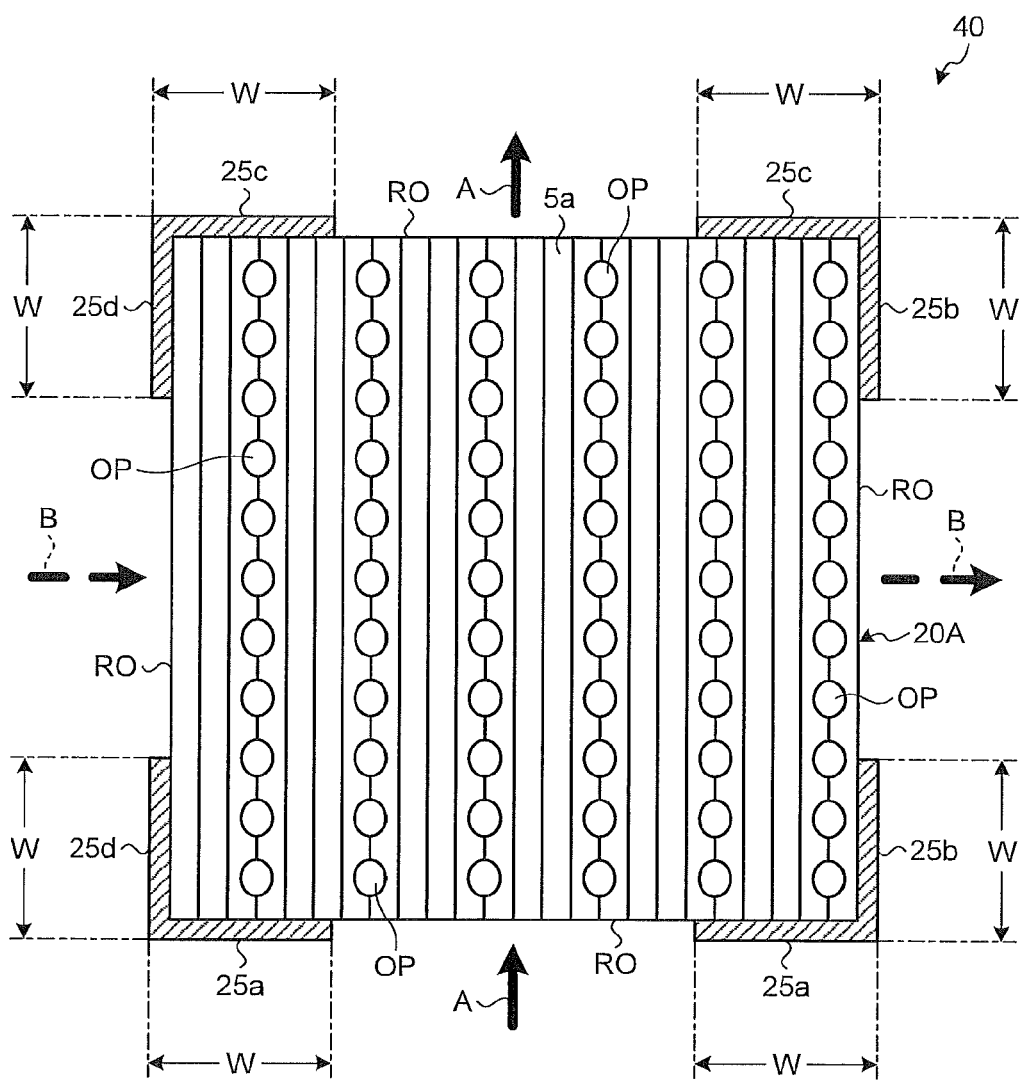
FIG. 10 is a schematic horizontal sectional view of the heat exchanger shown in FIG. 9.

FIG. 9 is a schematic perspective view of one example of the heat exchanger. FIG. 10 is a schematic horizontal sectional view of the heat exchanger shown in FIG. 9. A heat exchanger 40 shown in the drawings includes a heat exchange element 20A and a box-like frame body 30 in which the heat exchange element 20A is accommodated.

The heat exchange element 20A has an identical structure as that of the heat exchange element 20 shown in FIG. 1 except that the number of corrugations in each spacing member and the number of element-constituting units are greater than those of the heat exchange element 20 shown in FIG. 1. Therefore, explanations thereof will be omitted.

The frame body 30 is a box-like member provided at its four sides with rectangular openings RO. The frame body 30 includes a top plate member 21 covering an upper surface of the heat exchange element 20A, a bottom plate member 23 covering a lower surface of the heat exchange element 20A, and four rectangular frame portions 25a to 25d bordering the heat exchange element 20A. The rectangular frame portions 25a to 25d are located between the top plate member 21 and the bottom plate member 23. The heat exchange element 20A is accommodated in the frame body 30 such that an upper surface or a lower surface of the heat exchange element 20A in the layer stacking direction of each member is oriented downward. The top plate member 21 is detachably attached to the rectangular frame portions 25a to 25d such that the top plate member 21 can open and close.

According to the heat exchanger 40 constituted in this manner, the exchanging operation of sensible heat and the exchanging operation of latent heat are performed by the heat exchange element 20A between a primary air current and a secondary air current flowing into the heat exchanger 40. As shown with solid arrows A in FIGS. 9 and 10, the primary air current flows into the heat exchange element 20A through predetermined one of the rectangular openings RO formed in the frame body 30, flows through the heat exchange element 20A and flows out from the heat exchanger 40 through a rectangular opening RO opposed to the rectangular opening RO described above. Similarly, the secondary air current flows into the heat exchange element 20A through another rectangular opening RO formed in the frame body 30 as shown with arrows B in FIGS. 9 and 10, flows through the heat exchange element 20A, and flows out from the heat exchanger 40 through a rectangular opening RO opposed to the rectangular opening RO described above.

It is preferable that a width W (see FIG. 10) of a region of the heat exchange element 20A among the rectangular frame portions 25a to 25d that extends in the layer stacking direction of the partition members and the spacing members wide enough such that one of the second section walls explained in the first embodiment and a flow passage located outward of the second section wall in the arranging direction of the flow passages can be hidden. The expression "flow passage located outward of the second section wall in the arranging direction of the flow passages" means that a flow passage located outward of the second section wall in the arranging direction of the flow passages among the plurality of flow passages formed between the partition member joined under the spacing member and a partition member joined on the spacing member. According to the heat exchange element 20A, the first flow passages Po and the second flow passages Pi are alternately arranged in the first flow passage group PG1 shown in FIG. 3. Therefore, if the width W is set to 1 to 1.5 times of the pitch between the flow passages in the first flow passage group PG1, one second section wall and a flow passage located outward of the second section wall in the arranging direction of the flow passages can be hidden by the above region.

If the width W is selected, a primary air current or a secondary air current does not flow outward of the second section wall which is hidden by the region in the arranging direction of the flow passages. Therefore, even when the first flow passage Po (see FIGS. 1 to 3) is arranged outward in the arranging direction, leakage of an air current from the heat exchanger 40 can be suppressed. The upper limit of the width W can be appropriately selected while taking an effective opening area of the heat exchanger 40, that is, an opening area of each of the rectangular frame portions 25a to 25d into consideration. For example, when a heat exchange element having the first flow passage group PG1 (see FIG. 3) in which the first flow passages Po and the second flow passages Pi are alternately arranged is used, if the upper limit is set to 1.5 to 2.5 times of the pitch between the flow passages in the first flow passage group PG1, it is easy to obtain a heat exchanger having a smaller leakage of air current and a wide effective opening area.

The heat exchanger 40 with the structure described above has the heat exchange element 20A with an identical structure as that of the heat exchange element 20 explained in the first embodiment. Therefore, it is easy to obtain a total-heat type heat exchanger having high heat exchanging efficiency for the same reason as that explained in the first embodiment.

Third Embodiment

Figure 11:
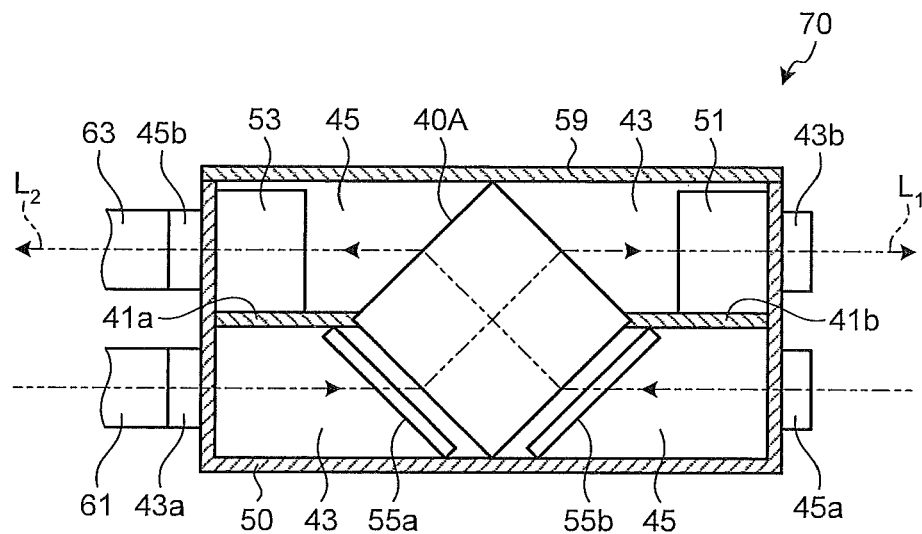
FIG. 11 is a schematic vertical sectional view of an example of a heat exchange ventilator.
Figure 12:
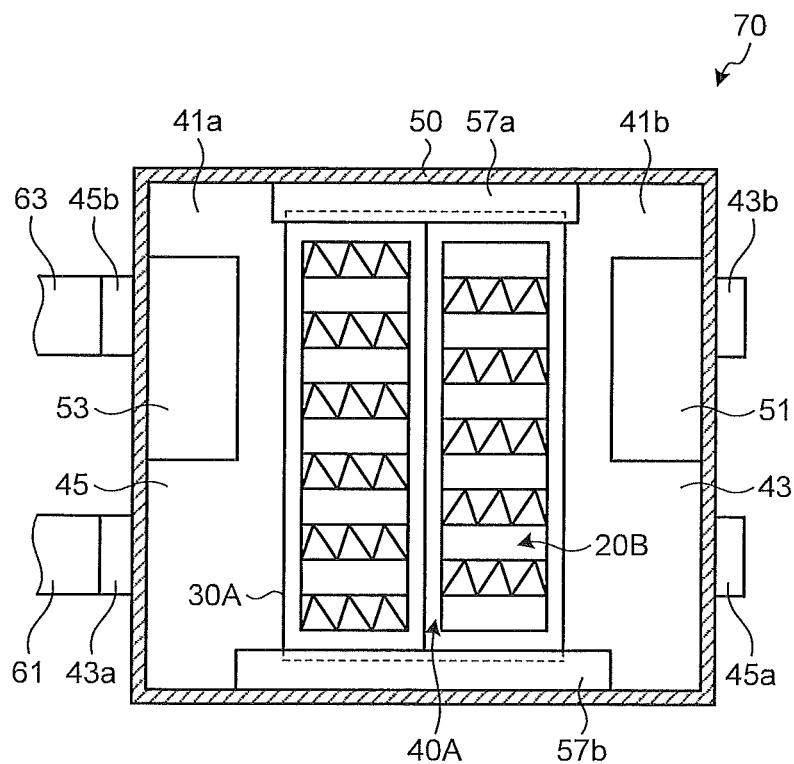
FIG. 12 is a schematic horizontal sectional view of the heat exchange ventilator shown in FIG. 11.

FIG. 11 is a schematic vertical sectional view of one example of the heat exchange ventilator. FIG. 12 is a schematic horizontal sectional view of the heat exchange ventilator shown in FIG. 11. A heat exchange ventilator 70 shown in the drawings includes a casing 50, a heat exchanger 40A arranged in the casing 50, a supply air blower 51, an exhaust air blower 53, two filters 55a and 55b arranged in the casing 50, a lid 59 mounted on the casing 50, and a supply blower tube 61 and an exhaust blower tube 63 connected to the casing 50.

Two partition walls 41a and 41b are provided in the casing 50 to divide the casing 50 into two in its depth direction. These two partition walls 41a and 41b are separated from each other at a central portion of the casing 50. A supply ventilation passage 43 and an exhaust ventilation passage 45 intersecting with each other at the central portion of the casing 50 are defined in the casing 50 by the two partition walls 41a and 41b and the lid 59. A supply inlet port 43a is provided on the side of an inlet of the supply ventilation passage 43 in the casing 50, and a supply outlet port 43b is provided on the side of an outlet thereof. Similarly, an exhaust inlet port 45a is provided on the side of an inlet of the exhaust ventilation passage 45 in the casing 50, and an exhaust outlet port 45b is provided on the side of an outlet thereof.

The supply air blower 51 is arranged on the side of the supply outlet port 43b of the supply ventilation passage 43, and a primary air current flowing toward the supply outlet port 43b from the supply inlet port 43a through the supply ventilation passage 43 is creased by the supply air blower 51. The exhaust air blower 53 is arranged on the side of the exhaust outlet port 45b of the exhaust ventilation passage 45, a secondary air current flowing toward the exhaust outlet port 45b from the exhaust inlet port 45a through the exhaust ventilation passage 45 is created by the exhaust air blower 53. In FIG. 11, the primary air current created by the supply air blower 51 is shown with a two-dot chain line L1, and the secondary air current created by the exhaust air blower 53 is shown with a two-dot chain line L2.

The heat exchanger 40A is arranged at an intersection between the supply ventilation passage 43 and the exhaust ventilation passage 45 in the casing 50, and performs the exchanging operation of sensible heat and the exchanging operation of latent heat between the primary air current flowing through the supply ventilation passage 43 and the secondary air current flowing through the exhaust ventilation passage 45. The heat exchanger 40A includes a heat exchange element 20B and a frame body 30A. Structures of the heat exchange element 20B and the frame body 30A are identical as those of the heat exchange element 20A and the frame body 30 explained in the second embodiment. Therefore, explanations thereof will be omitted.

The filter 55a is arranged frontward of the heat exchanger 40A of the supply ventilation passage 43 to prevent dust from flowing into the heat exchange element 20B. The filter 55b (see FIG. 11) is arranged frontward of the heat exchanger 40A of the exhaust ventilation passage 45. The heat exchanger 40A is held by a pair of holders 57a and 57b (see FIG. 12) arranged in the casing 50. One end of the supply blower tube 61 is connected to the supply inlet port 43a, and one end of the exhaust blower tube 63 is connected to the exhaust outlet port 45b.

The heat exchange ventilator 70 with the above structure is arranged such that the supply outlet port 43b and the exhaust inlet port 45a are located in a room, and the other end of the supply blower tube 61 and the other end of the exhaust blower tube 63 are located outside of the room, and the air conditioning in the room is performed. The heat exchange ventilator 70 includes the heat exchanger 40A with an identical structure as that of the heat exchanger 40 explained in the second embodiment. Therefore, it is easy to obtain a total-heat type heat exchanger having high heat exchanging efficiency for the same reason as that explained in the second embodiment.

While the heat exchange element, the manufacturing method thereof, the heat exchanger, and the heat exchange ventilator according to the present invention have been explained above by describing exemplarily embodiments, the present invention is not limited to the above embodiments. For example, while the heat exchange element explained in the embodiments includes a top member, the top member can be omitted. A plane shape of a hole formed in the spacing member can be appropriately selected, and the shape can be an elliptic shape that is long in a longitudinal direction of the flow passage, or a rectangular shape that is long in the longitudinal direction of the flow passage. A size of the hole, the number of holes, and a pitch between the holes can be appropriately selected while taking the strength of material of the spacing member into consideration, so that this arrangement avoids a situation such that the compression strength of the spacing member is deteriorated by providing a plurality of holes and it becomes difficult to handle the spacing member.

Figure 13:
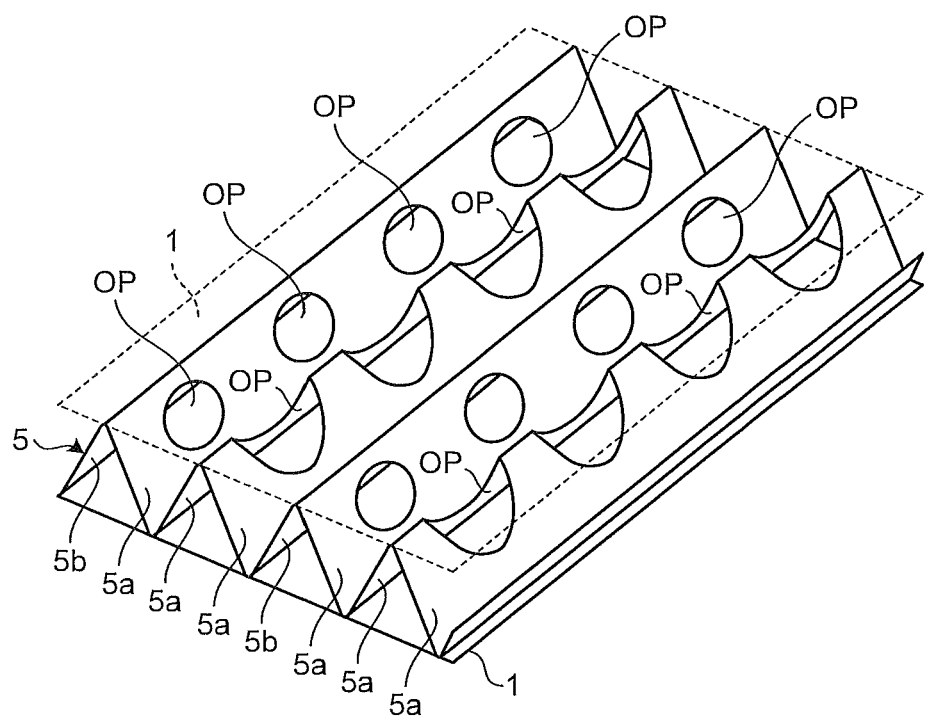
FIG. 13 is a schematic perspective view of an example of a spacing member in which one second section wall and three first section walls are alternately arranged.

The first section walls and the second section walls of the spacing member can be alternately arranged two each, the first section wall and the second section wall can be alternately arranged one each, or the walls can be alternately arranged three or more each, or one or more first section walls and one or two second section walls can be alternately arranged. FIG. 13 is a schematic perspective view of an example of the spacing member 5 in which one second section wall 5b and three first section walls 5a are alternately arranged. In FIG. 13, the partition member 1 joined under the spacing member 5 and the partition member 1 joined on the spacing member 5 are shown. A pattern of layout of the first section wall 5a and the second section wall 5b can be appropriately selected while taking into consideration a degree of weight reduction of the heat exchange element and a degree of enhancement of the heat exchanging efficiency. In the present invention, various changes, modifications, and combinations other than the above embodiments can be achieved.

The invention claimed is:

1. A heat exchange element, comprising:
a stacked-layer structure including sheet-like partition members having a moisture absorbent added thereto and spacing members stacked alternately, the spacing members joined with the partition members to form air flow passages together with the partition members, wherein
each of the spacing members includes a plurality of section walls that divide a space between the partition member joined under the spacing member and the partition member joined on the spacing member into a plurality of flow passages, and
first flow passages including first section walls formed with holes that bring flow passages adjacent the first flow passages in a same layer into flow communication with each other, and second flow passages including solid section walls for isolating the second flow passages from flow passages, in a same layer, adjacent the second flow passages, wherein the second flow passages and the first flow passages are arranged in an alternating order in each of the spacing members, the first section walls each form a joined portion and are formed with the holes at a plurality of positions thereof, the joined portions attached to the partition member, and the joined portion between the first section walls and the partition member are split by the holes formed at the plurality of positions.

2. The heat exchange element according to claim 1, wherein a length of the hole along a longitudinal direction of the joined portion is equal to or less than two times of a pitch between the flow passages.

3. A heat exchanger, comprising:
a box like frame body; and
a heat exchange element, the heat exchange element accommodated by the box like frame body, the heat exchange element including a stacked-layer structure including sheet-like partition members having a moisture absorbent added thereto and spacing members stacked alternately, the spacing members joined with the partition members to form air flow passages together with the partition members, the frame body includes a top plate member covering an upper surface of the heat exchange element, a bottom plate member covering a lower surface of the heat exchange element, and four rectangular frame portions that are located between the top plate member and the bottom plate member to border the heat exchange element, wherein
each of the spacing members includes a plurality of section walls that divide a space between the partition member joined under the spacing member and the partition member joined on the spacing member into a plurality of flow passages, and
first flow passages including section walls formed with holes that bring flow passages adjacent the first flow passages in a same layer into flow communication with each other, and second flow passages including solid section walls for isolating the second flow passages from flow passages, in a same layer, adjacent the second flow passages, wherein the second flow passages and the first flow passages are arranged in an alternating order in each of the spacing members, the first section wall is formed with the holes at a plurality of positions thereof, and a joined portion between the first section wall and the partition member is split by the holes formed at the plurality of positions.

4. The heat exchanger according to claim 3, wherein a length of the hole along a longitudinal direction of the joined portion is equal to or less than two times of a pitch between the flow passages.

5. The heat exchanger according to claim 3, wherein a width of each region of the rectangular frame portion extending in a layer stacking direction of the partition members and the spacing members is wide enough such that one of the second section walls and a flow passage located outward of the second section wall in an arranging direction of the flow passages can be hidden.

6. A heat exchange ventilator, comprising:
a supply ventilation passage;
an exhaust ventilation passage intersecting with the supply ventilation passage;
a supply air blower arranged in the supply ventilation passage;
an exhaust air blower arranged in the exhaust ventilation passage; and
a heat exchanger arranged at an intersection between the supply ventilation passage and the exhaust ventilation passage, in which the heat exchanger includes a box-like frame body and a heat exchange element accommodated by the box-like frame body wherein
the heat exchange element has a stacked-layer structure including sheet-like partition members having a moisture absorbent added thereto and spacing members stacked alternately, the spacing members joined with the partition members to form air flow passages together with the partition members, the frame body includes a top plate member covering an upper surface of the heat exchange element, a bottom plate member covering a lower surface of the heat exchange element, and four rectangular frame portions that are located between the top plate member and the bottom plate member to border the heat exchange element, each of the spacing members includes a plurality of section walls that divide a space between the partition member joined under the spacing member and the partition member joined on the spacing member into a plurality of flow passages, and first flow passages including section walls formed with holes that bring flow passages adjacent the first flow passages in a same layer into flow communication with each other, and second flow passages including solid section walls for isolating the second flow passages from flow passages, in a same layer, adjacent the second flow passages, wherein the second flow passages and the first flow passages are arranged in an alternating order in each of the spacing members, the first section wall is formed with the holes at a plurality of positions thereof, and a joined portion between the first section wall and the partition member is split by the holes formed at the plurality of positions.

7. The heat exchange ventilator according to claim 6, wherein a length of the hole along a longitudinal direction of the joined portion is equal to or less than two times of a pitch between the flow passages.

8. The heat exchange ventilator according to claim 6, wherein a width of each region of the rectangular frame portion extending in a layer stacking direction of the partition members and the spacing members is wide enough such that one of the second section walls and a flow passage located outward of the second section wall in an arranging direction of the flow passages can be hidden.

* * * * *